| (12) United States Patent<br>Marandi et al. | (10) Patent No.: US 9,423,819 B2<br>(45) Date of Patent: Aug. 23, 2016 |
|---|---|

(54) OPTICAL QUANTUM RANDOM NUMBER GENERATOR

(71) Applicant: The Board of Trustees of the Leland Stanford Junior University, Stanford, CA (US)

(72) Inventors: Alireza Marandi, Palo Alto, CA (US); Konstantin L. Vodopyanov, Stanford, CA (US); Robert L. Byer, Stanford, CA (US)

(73) Assignee: The Board of Trustees of the Leland Stanford Univeristy, Stanford, CA (US)

( * ) Notice: Subject to any disclaimer, the term of this patent is extended or adjusted under 35 U.S.C. 154(b) by 597 days.

(21) Appl. No.: 13/783,128

(22) Filed: Mar. 1, 2013

(65) Prior Publication Data

US 2014/0016168 A1 Jan. 16, 2014

Related U.S. Application Data

(60) Provisional application No. 61/672,171, filed on Jul. 16, 2012.

(51) Int. Cl.
*G06E 1/00* (2006.01)
*G06N 99/00* (2010.01)
*B82Y 10/00* (2011.01)

(52) U.S. Cl.
CPC . *G06E 1/00* (2013.01); *B82Y 10/00* (2013.01); *G06N 99/002* (2013.01)

(58) Field of Classification Search
CPC ......... G06E 1/00; G06N 99/002; B82Y 10/00

USPC .................................................. 359/107–108
See application file for complete search history.

(56) References Cited

U.S. PATENT DOCUMENTS 6,393,448 B1 5/2002 Dultz et al.
6,609,139 B1 8/2003 Dultz et al.
7,284,024 B1 * 10/2007 Trifonov et al. .................. 708/3

OTHER PUBLICATIONS

Bustard, et al., "Quantum random bit generation using stimulated Raman scattering." Optics Express 25173, vol. 19, No. 25 (Dec. 2011).
Fiorentino et al., "Secure self-calibrating quantum random-bit generator." Phys. Rev. A 75, 032334 (2007).
Fürst et al., "Quantum light from a whispering-gallery-mode disk resonator." Phys. Rev. Lett. 113901 (Mar. 18, 2011).
Gabriel, et al, "A generator for unique quantum random numbers based on vacuum states." Nature Photonics, vol. 4:711-715 (Oct. 2010).
Harris et al., "Observation of tunable optical parametric fluorescence." Phys. Rev. Lett., vol. 18, No. 18: 732-734 (May 1, 1967).
Jofre et al., "True random numbers from amplified quantum vacuum." Optics Express, vol. 19, No. 21 (Oct. 2011).

(Continued)

*Primary Examiner* — Jennifer L. Doak
(74) *Attorney, Agent, or Firm* — Foley & Lardner LLP; Cliff Z. Liu; Angela D. Murch

(57) ABSTRACT

A random number generator includes a light source emitting light at a first frequency, an optical unit including an optical component configured to receive light at the first frequency and emit light at a second frequency, and a measurement unit configured to receive light at the second frequency, and generate a random output value related to a phase parameter of the light at the second frequency.

21 Claims, 6 Drawing Sheets

(56) References Cited

OTHER PUBLICATIONS

Lecomte et al., "Synchronously pumped optical parametric oscillator with a repetition rate of 81.8 GHz." IEEE Photonics Tech. Lett. vol. 17, No. 2: 483-485 (Feb. 2005).

Leindecker, et al., "Broadband degenerate OPO for mid-infrared frequency comb generation." Optics Express Col. 19, No. 7: 6296-6302 (Mar. 28, 2011).

Levy et al., "CMOS-compatible multiple-wavelength oscillator for on-chip optical interconnects." Nat. Photonics vol. 4: 37-40 (Dec. 20, 2009).

Liu et al., "Mid-infrared optical parametric amplifier using silicon nanophotonic waveguides." Nat. Photonics vol. 4: 557-560 (May 23, 2010).

Louisell et al., "Quantum fluctuations and noise in parametric processes." Phys. Rev. vol. 124, No. 6: 1646-1654 (Dec. 15, 1961).

Marandi et al., "Coherence properties of a broadband femtosecond mid-IR optical parametric oscillator operating at degeneracy." Optics Express vol. 20, No. 7: 7255-7262 (Mar. 26, 2012).

Marandi et al., "Twin degenerate OPO for quantum random bit generation." Optical Soc. Am. (2011).

Marandi et al., "All-optical quantum random bit generation from intrinsically binary phase of parametric oscillators." Optical Soc. Am. vol. 20, No. 17:19322-19330 (Aug. 13, 2012).

Myers et al., "Quasi-phase-matched optical parametric oscillators in bulk periodically poled $LiNbO_3$." J. Opt. Soc. Am. B, vol. 12, No. 11: 2102-2116 (Nov. 1995).

Nabors et al., "Coherence properties of a doubly resonant monolithic optical parametric oscillator." J. Opt. Soc. Am. B. vol. 7, No. 5: 815-820 (May 1990).

Pironio et al., "Random numbers certified by Bell's theorem." Nat. Lett. vol. 464:1021-1024 (Apr. 15, 2010).

Qi et al., "High-speed quantum random number generation by measuring phase noise of a single-mode laser." Optics Lett. vol. 35, No. 3: 312-314 (Feb. 2010).

Razzari et al., "CMOS-compatible integrated optical hyper-parametric oscillator." Nat. Photonics vol. 4:41-45 (Dec. 20, 2009).

Ren et al., "Quantum random-number generator based on a photon-number-resolving detector." Phys. Rev. A 83, 023820 (2011).

Rukhin, et al., "A statistical test suite for random and pseudorandom number generators for cryptographic applications." NIST, Special Publication 800-22 (Apr. 2010).

Shih, et al., "New type of Einstein-Podolsky-Rosen-Bohm experiment using pairs of light quanta produced by optical parametric down conversion." Phys. Rev. Lett. vol. 61, No. 26: 2921-2924 (Dec. 1988).

Wahl et al., "An ultrafast quantum random number generator with provably bounded output bias based on photon arrival time measurements." Appl. Phys. Lett. 98, 171105 (2011).

Wong et al., "Self-phase-locked divide-by-2 optical parametric oscillator as a broadband frequency comb source." J. Opt. Soc. Am. B vol. 27, No. 5: 876-882 (May 2010).

Wu et al., "Generation of squeezed states by parametric down conversion." Phys. Rev. Lett. vol. 57, No. 20: 2520-2523 (Nov. 17, 1986).

\* cited by examiner

OPTICAL QUANTUM RANDOM NUMBER GENERATOR

CROSS-REFERENCE TO RELATED APPLICATION

This application claims the benefit of U.S. Provisional Patent Application No. 61/672,171 filed Jul. 16, 2012, the disclosure of which is incorporated herein by reference in its entirety.

STATEMENT REGARDING FEDERALLY SPONSORED RESEARCH OR DEVELOPMENT

This invention was made with Government support under contract number N00014-10-1-0281 awarded by the Office of Naval Research. The Government has certain rights in this invention.

BACKGROUND

Random numbers may be used in cryptography, computer simulations, data storage, and secure data transfer, among other applications. Truly random numbers are desirable for such applications. Software-based random number generators (RNG) are not completely random and are not immune to attack. It is therefore desirable to have truly random physical RNGs not dependent on software.

SUMMARY

Random quantum phenomena may be used as the basis for a physical RNG.

DETAILED DESCRIPTION

A physical RNG may be implemented using one or more OPOs or OPGs. The RNG is based on the inherently random quantum-mechanical phase of outputs generated through a down-conversion process in a nonlinear optical component, related to the randomness in the phase of quantum noise At the quantum level, a nonlinear optical component of some implementations converts an input photon oscillating at one frequency to multiple output photons oscillating at frequencies other than the frequency of the input photon, and with random phase related to random quantum noise. The sum of the frequencies of the multiple output photons has a relationship to the frequency of the input photon. In an nth-order parametric down-conversion process, there are n output photons generated from one input photon. This feature of a nonlinear process is the basis for an implementation of the RNG using an OPO or and OPG, which includes a nonlinear crystal.

At the signal level, when an input light wave impinges on an nth-order nonlinear crystal in some implementations, the crystal passes part of the input wave, and converts the rest of the input wave into n output waves, where the sum of the frequencies of the n output waves has a relationship to the frequency of the input wave. This feature of a nonlinear crystal is the basis for an implementation of the RNG using an OPO or an OPG, which include a nonlinear crystal.

The conversion of light at one frequency to light at a lower frequency is sometimes referred to as optical parametric down conversion.

An OPO of some implementations includes a nonlinear optical crystal and an optical resonator. In an nth-order OPO, input light ("the pump") received at the crystal is converted into n crystal outputs of known frequency. The resonator in the OPO is designed to resonate at a selected one of the crystal output frequencies, which is herein referred to as the signal. The light in the OPO, including the signal, repeatedly loops through the resonator and crystal, and each time, the intensity at the signal frequency is amplified. The OPO eventually reaches a stable state at the signal frequency if the inherent gain of the OPO is at least equal to the inherent loss of the OPO.

The stable OPO signal has a phase relative to the pump. Each time that the OPO is started, it will stabilize with a randomly-acquired phase. Each restart of the OPO thus results in generation of a new signal with random phase. The random phase of a signal is used to determine a discrete random number in an RNG.

Figure 1A:
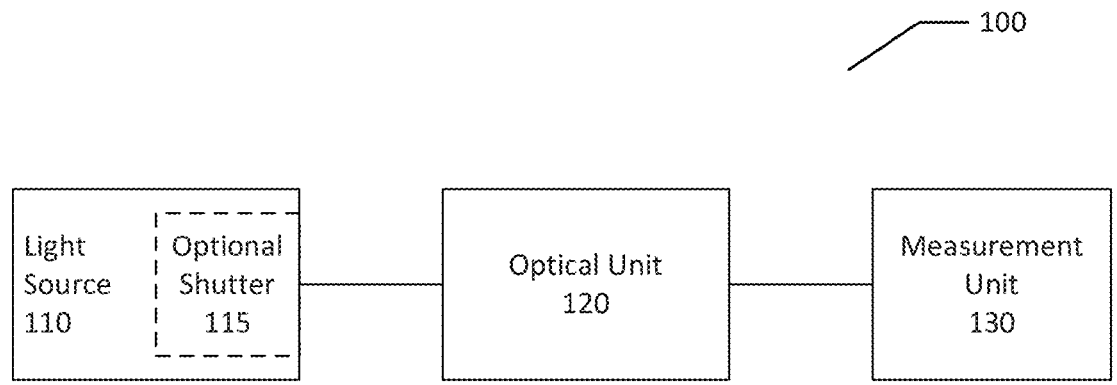
FIG. 1A illustrates an example optical RNG.

FIG. 1A illustrates an overview of an RNG 100 including a light source 110, an optical unit 120, and a measurement unit 130. Light from source 110 is converted to optical information within optical unit 120, which is used by measurement unit 130 to determine a discrete random number.

Light source 110 may be any source of light in any spectrum, and the light may be broadband or narrowband light. Light source 110 may be a continuous-wave source or a pulsed source. Light source 110 in some implementations is a laser.

Light source 110 includes optional shutter 115. When pumping an OPO (i.e., generating a pump for the OPO) for example, shutter 115 may selectively occlude light source 110 so as to pump the OPO for a limited time or for a limited number of pulses. Shutter 115 may be opened for a first amount of time to allow pumping of the OPO then closed for a second amount of time to occlude light source 110 and thereby stop pumping the OPO. Shuttering allows for restarting of the OPO without residual signal information so that the OPO may stabilize with random phase. With no pumping, after a time (dependent on the characteristics of the OPO and source 110), light circulating in the OPO will decay below the noise floor of the OPO.

If light source 110 is pulsed, and the time between pulses is long enough to allow the signals to decay below the noise floor, then shutter 115 may be omitted. Further, in one implementation including an OPG instead of an OPO, as will be described below, shutter 115 may be omitted.

Optical unit 120 outputs a signal to measurement unit 130, to determine phase information which may then be used to determine a random number. Phase information may be a phase parameter such as a phase of a signal with respect to the pump, or a phase difference between two or more signals. Optical unit 120 and measurement unit 130 are described in detail below with respect to several implementations of RNG 100.

For the case in which optical unit 120 includes a degenerate second-order OPO, a crystal converts a pump into two outputs, a signal and an idler at the same frequency equal to half the pump frequency. The signal and idler can be considered to be indistinguishable from each other, and are referred to together as the signal. A resonator is designed to resonate at the signal frequency. The stable wave generated by the OPO has one of two opposite phases (i.e., phases separated by $\pi$), and the phase acquired is a random result due to quantum noise. Thus, the bi-stable random phase may be used as the basis for generating random-valued bits in a binary number. Examples of nonlinear crystals include MgO-doped periodically poled lithium niobate, $BaB_2O_4$, and $KNbO_3$.

Figure 1B:
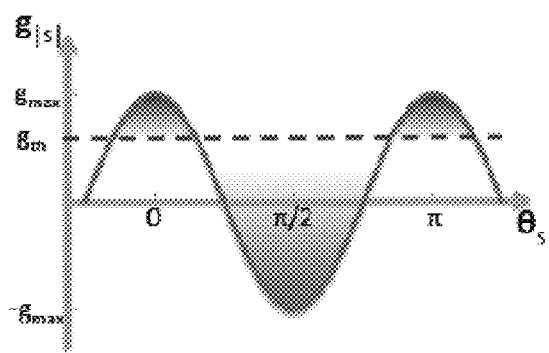
FIG. 1B illustrates phase versus gain in a second-order degenerative optical parametric oscillator (OPO).

FIG. 1B illustrates the incremental amplitude gain in a second-order degenerate OPO as a function of the relative phase between the pump and the signal. Maximum amplification of the signal occurs when the relative phase is zero or pi, where the energy flows from the pump into the signal, and maximum attenuation of the signal occurs when the relative phase is pi/2, where the energy flow is from the signal to the pump. If the maximum gain exceeds the loss in the resonator, depending on the zero-point fluctuations of the signal modes, the OPO will stably oscillate with the phase of either zero or pi. None of the design parameters favors oscillation in one or the other phase in some implementations.

Figure 2A:
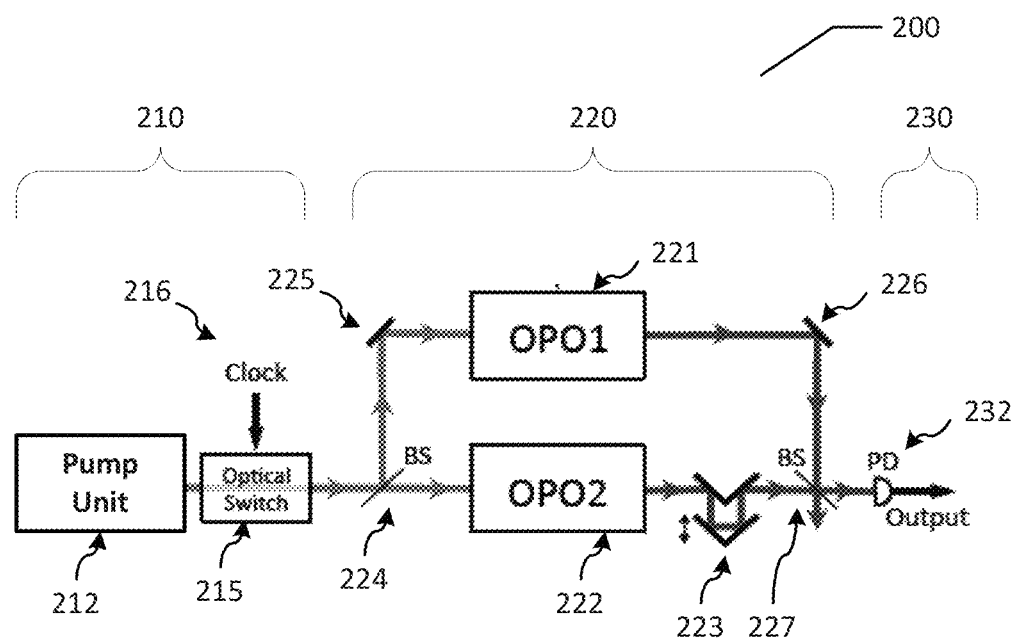
FIG. 2A illustrates an example optical RNG including dual OPOs.

FIG. 2A illustrates an RNG 200, including a light source 210, an optical unit 220, and a measurement unit 230.

Light source 210 is illustrated as a pump unit 212 and an optical switch 215 with a clock 216. Pump unit 212 may be continuous wave or pulsed. Optical switch 215 is opened or closed according to clock 216, to allow or block pumping of optical unit 220, respectively.

Optical unit 220 includes a first OPO 221 (labeled "OPO1"), a second OPO 222 ("labeled OPO2"), a path adjuster 223, a beam splitter 224, a beam splitter 227, a reflector 225 and a reflector 226.

OPO 221 and OPO 222 are matched OPOs, with matched nonlinear optical crystals and matched resonators. Pump unit 212 output (as modified by switch 215) is directed to beam splitter 224 and split into separate pumps for OPO 221 and OPO 222. The pump for OPO 221 is directed to OPO 221 by reflector 225. If switch 215 is kept open long enough, the output of each OPO 221 or 222 stabilizes to a signal of a known frequency and random phase.

Path adjuster 223 is provided to adjust the optical length of the path, extending from OPO 222 to beam splitter 227, to match the optical length of the path through OPO 221 to beam splitter 227. Optical path length as used in this document relates to the time needed for light to traverse the length of the path. Reflector 226 directs the output of OPO 221 toward beamsplitter 227. Beamsplitter 227 adds the signals from OPO 221 and OPO 222.

In the case in which OPO 221 and OPO 222 are matched degenerate second-order OPOs, the signals generated by OPO 221 and OPO 222 both have a frequency that is half of the pump frequency and a phase with respect to the pump of either zero or pi ($\pi$).

Figure 2B:
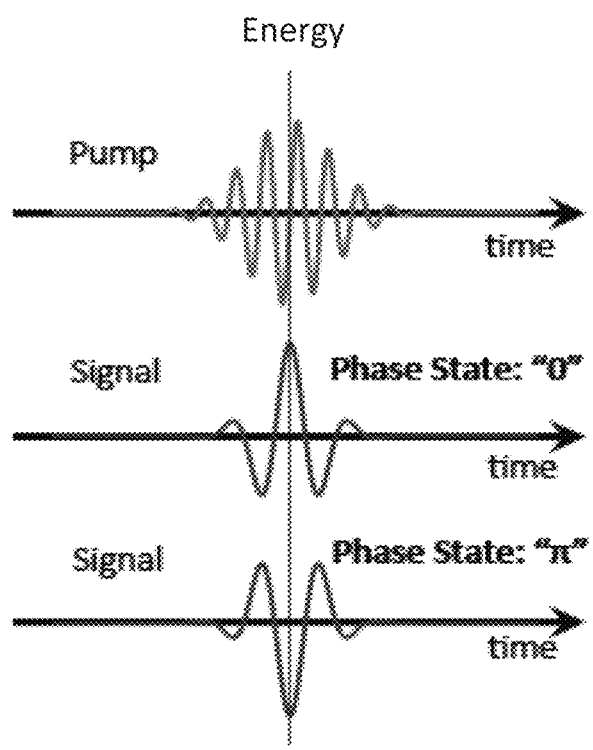
FIG. 2B illustrates phase information related to signals in an OPO.

FIG. 2B illustrates field waveforms for two OPO signals as related to the field of a pulsed pump, where one OPO signal is zero-phase and the other OPO signal is pi-phase with respect to the pump. The field waveforms of the OPO output signals are similar with respect to amplitude versus time, but phase is different by pi. Adding similar waveforms, both with zero-phase, results in a zero-phase waveform. Adding similar waveforms, both with pi-phase, results in a pi-phase waveform. Adding similar waveforms, one with zero-phase and one with pi-phase, results in one waveform canceling the other in the ideal case, such that the sum is zero. In an actual system, noise in the signals may not cancel, and therefore the sum will generally not be zero. An RNG may be implemented with OPOs that generate output signals at randomly zero-phase and pi-phase.

Referring again to FIG. 2A, measurement unit 230, which includes a photodetector 232, receives the sum of signals from beamsplitter 227. Photodetector 232 measures intensity of light received but does not recognize phase of the light. Therefore, zero-phase and pi-phase will affect photodetector 232 in the same manner. Photodetector 232 outputs a high signal for both zero-phase and pi-phase signal sums, indicating that the outputs of both OPOs were in phase with each other, and outputs a low signal for a signal sum in which the amplitudes canceled. Other detectors may be used instead of photodetector 232, such that the phase may be read directly from a signal.

Measurement unit 230 may use the output of photodetector 232 to determine a random number. As the output of photodetector 232 is either high or low, it can be directly converted to a binary representation by comparison to a threshold. For example, if the output of photodetector 232 was above a threshold, a binary value of "one" may be assigned, and if the output of photodetector 232 was below the threshold, a binary value of "zero" may be assigned. Alternatively, the binary values may be assigned in opposite manner, such that above the threshold is assigned a "zero" and below the threshold is assigned a "one". As measurement unit 230 assigns a value to each of a sequence of the signal sums, a sequence of binary numbers results.

FIG. 2B illustrated the use of a pulsed pump. A continuous wave pump may used instead, by opening switch 215 for a time long enough to generate a stable signal, then closing switch 215 for a time long enough to decay the signal in OPO 221 or OPO 222. The OPO signal will then be continuous for a time instead of pulsed as illustrated in FIG. 2B.

Figure 3:
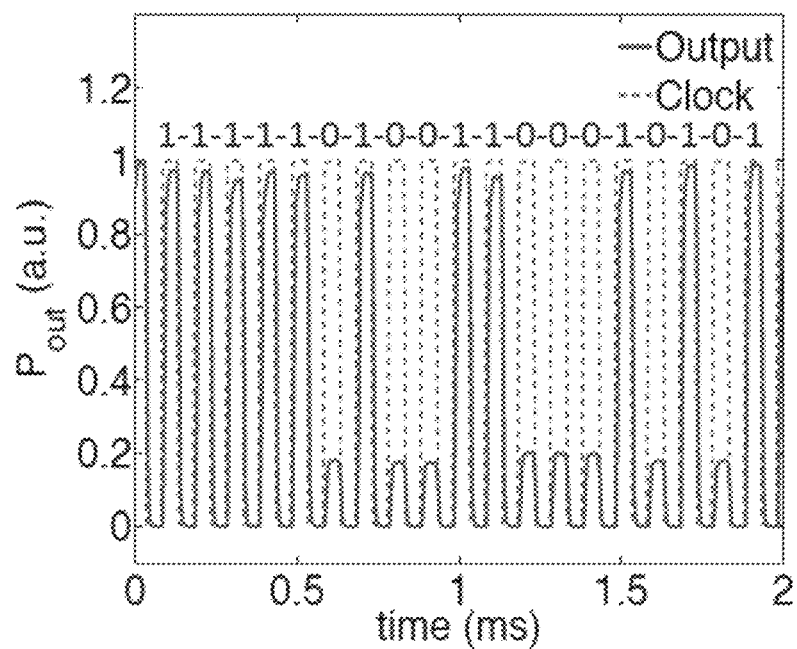
FIG. 3 illustrates an example random sequence generated by an optical RNG.

FIG. 3 illustrates a graph plotting time in milliseconds versus output power of a photodetector, such as photodetector 232 in RNG 200. Output power is shown scaled such that the maximum value is one. A clock signal, such as from clock 216 of RNG 200, is also plotted on the graph as a dotted line square wave, where a high level of the clock square wave indicates that optical switch 215 is open, and a low level indicates that optical switch 215 is closed. Photodetector output power is plotted in solid lines on the graph. A threshold value may be established between the noise level (approximately 0.2 on the graph) and maximum (1 on the graph), such that during each clock high pulse, a binary number is assigned to the sum of the OPO signals as described above. For example, at the clock pulse starting at 1 ms, the photodetector output power is approximately a "one" on the graph, and a logic value of "one" has been assigned because the power is above a threshold.

Over time, a sequence of clocked pumping as described results in the generation of a sequence of binary numbers, which are random. Therefore, the system with parallel OPOs 221 and 222 as described with respect to FIG. 2A forms RNG 200.

A variation of RNG 200 is to maintain OPO 221 with a consistent acquired zero- or pi-phase signal by pumping OPO 221 continuously, while switching OPO 222 on and off to generate a sequence of signals each with random phase, and comparing the consistent phase signal of OPO 221 with the random phase signal of OPO 222 to generate a random number. Alternatively, OPO 221 may be replaced with any consistent phase source at the signal frequency.

Figure 4A:
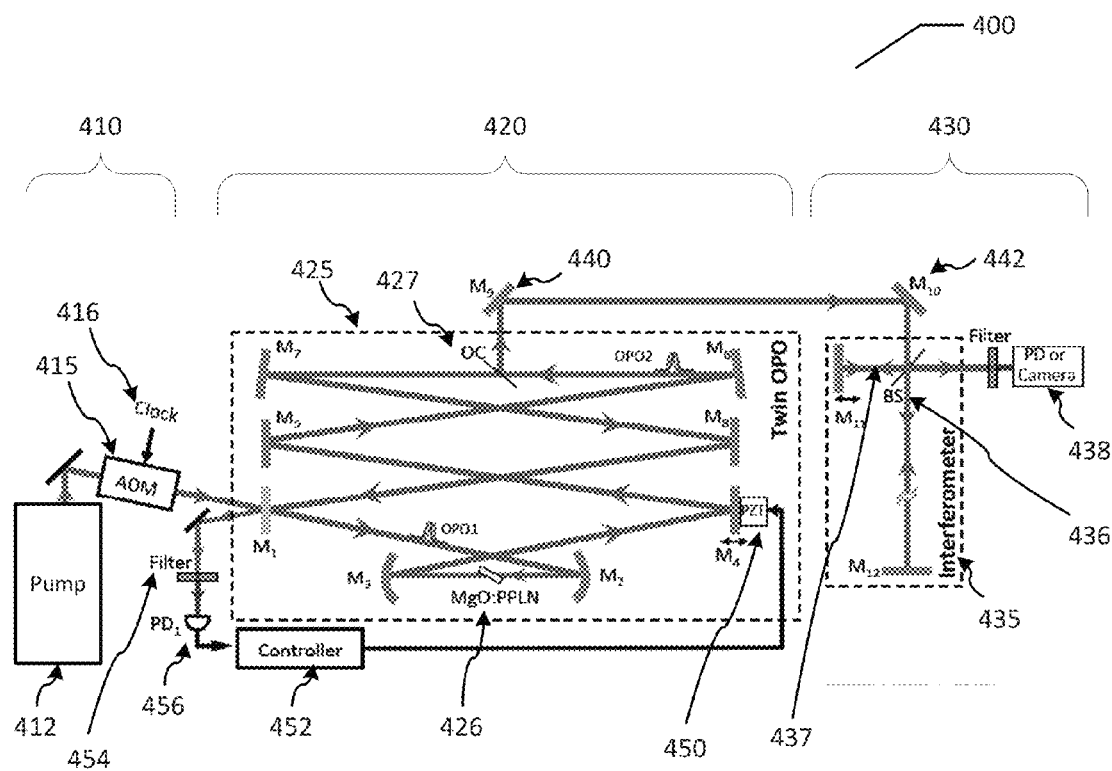
FIG. 4A illustrates an example of an n-OPO optical RNG.

FIG. 4A illustrates an RNG 400 based on the random quantum physical properties of an OPO. At a high level, RNG 400 may operate in a similar way as RNG 200: pumping of two matched optical unit results in two signals with similar waveform and random phase, the signals are summed, the sum is applied to a photodetector, and the output power of the photodetector is used to assign a binary number to the signal, where the binary number is random. One distinction between RNG 200 and RNG 400 is that the single OPO of RNG 400 may operate as if it were multiple OPOs.

RNG 400 includes a light source 410, an optical unit 420, and a measurement unit 430. Light source 410 includes a pump 412, an optical switch 415, and a clock 416, which operate together in a manner similar to the description of light source 210 of FIG. 2A.

Optical unit 420 includes an OPO 425 with a nonlinear crystal 426 and a resonant cavity. A resonant cavity may be a microresonator, linear resonator, ring resonator, disk resonator, waveguide, or fiber based resonator, for example. Resonator size can vary. In the implementation of FIG. 4A, the resonant cavity includes reflective surfaces ("RS") M1-M8, each of which may be fully or partially reflective, and may be partially reflective on one surface and fully reflective on an opposite surface. Optical path length of a resonant cavity may be adjusted in a control loop to compensate for system changes. For example, in FIG. 4A, a piezo transducer 450 may be controlled by a controller 452 to move RS M4 back and forth in response to a difference (i.e., "error") between the phase of the transmitted and received pump. The error signal may be generated, for example, by modulating a frequency on the transmitted pump frequency and filtering the modulated frequency out of the received pump in filter 454. Intensity of the filtered error signal may be measured in a photodetector 456 and provided to controller 452.

OPO 425 further includes an output coupler 427. Output coupler 427 is a beam splitter that passes part and reflects part of any received light.

Light source 410 pumps light into OPO 425 through RS M1 to RS M2 and through crystal 426. At least a portion of the energy of the pump is converted in crystal 426 to multiple outputs. The outputs and the remaining portion of the pump circulate through the resonant cavity of OPO 425 by reflection off of the RS sequence M3-M4-M5-M6-M7-M8-M1-M2 followed by propagation again through crystal 426, and so on.

To generate a signal at a magnitude large enough to be detected over the noise in the system, energy is added to OPO 425 until the signal stabilizes at a randomly-acquired phase. This may be accomplished, for example, by pumping several pulses.

A single OPO may be implemented by OPO 425. To implement a single OPO using OPO 425 with pulsed pumping, the resonant cavity is arranged such that the roundtrip optical path length of the resonant cavity is equal to the time between pump pulses. Optical path length in this context means the time required for the light to traverse the path. A sequence of pulses is applied to OPO 425, and each new pulse is introduced at approximately the same time as the existing signal begins its next loop of the resonant cavity upon reflection from RS M1. For example, the number of pulses required may be equal to ten.

An n-OPO may be implemented in OPO 425 by arranging the resonant cavity such that the roundtrip optical path length is equal to n times the time between pump pulses. Operation of a 2-OPO implemented using OPO 425 in pulsed mode is described next.

OPO 425 is labeled "Twin OPO" in FIG. 4A to indicate that it may be implemented as a 2-OPO, which is effectively two matched degenerate second-order OPOs sharing the same crystal and resonant cavity. Roundtrip optical path length of the cavity is twice the time between pump pulses. When a first pump pulse is introduced to the Twin OPO, crystal 426 generates a first signal at half the frequency of the pump, which begins to circulate in the resonant cavity. Note that "signal" in the second-order degenerate OPO is the indistinguishable combination of the "signal" and "idler". The first signal travels an optical path length equal to the time between pump pulses before the second pump pulse is introduced to the Twin OPO. Crystal 426 generates a second signal at half the frequency of the pump, which also begins to circulate in the resonant cavity. The second signal travels a distance equal to the time between pump pulses by the time a third pump pulse is introduced. The third pump pulse serves to augment the first signal, as the first signal and the third pump pulse arrive at crystal 426 at approximately the same time. Similarly, a fourth pump pulse serves to augment the second signal.

It can be seen that in the second-order degenerative Twin OPO, the first, third, fifth, and so on signals build to form an "odd" OPO signal, and the second, fourth, sixth, and so on signals build to form an "even" OPO signal. "Odd" and "even" is used in this manner merely as nomenclature to distinguish the two OPO signals and does not describe any feature of the two signals themselves. The odd and even OPO signals do not interact with each other. Therefore, the Twin OPO is effectively two OPOs sharing the same components.

Figure 4B:
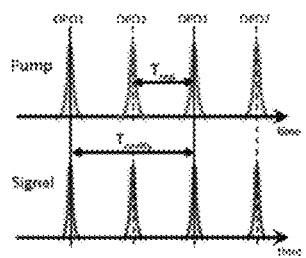
FIG. 4B illustrates sequences of signal and pump pulses from an OPO.

FIG. 4B illustrates how the pump pulses relate to the odd and even OPO signals. Pulses augmenting the odd OPO signal are labeled OPO1, and pulses augmenting the even OPO signal are labeled OPO2.

Referring again to FIG. 4A, output coupler 427 reflects part of the odd and even OPO signals (with some residual portion of the pump) to measurement unit 430 by way of reflective surfaces (RS) 440 and 442. One or both of RS 440 and 442 may be included in optical unit 420 or in measurement unit 430.

Measurement unit 430 receives the odd and even OPO signals in interferometer 435. The even OPO signal lags the odd OPO signal by an amount of time equal to the time between pump pulses. To sum the odd and even OPO signals, the odd OPO signal is delayed in interferometer 435 by a time equal to the lag. Interferometer 435 includes two optical path arms 436 and 437 where the difference between the roundtrip optical paths of arms 436 and 437 is equal to the time that the even OPO signal lags the odd OPO signal. The output of interferometer 435 is a summed signal.

Alternatively to using interferometer 435 to introduce a delay, a reference OPO may be used to generate a signal to sum with the either, or both of, the odd and even OPO signals.

Measurement unit 430 filters the summed signal to remove residual pumps, and then measures the intensity of the summed signal using detector 438, such as a photodetector or camera. The intensity of the summed signal may then be converted to binary values, as described above.

The Twin OPO described with respect to FIG. 4A is one example of an n-OPO. Another example is a 3-OPO ("Triplet OPO"), in which the roundtrip optical path length of the Triplet OPO is three times the period between pump pulses, thus, three unrelated signals are generated within the Triplet OPO, separated by the time between pump pulses. The three signals circulate in the Triplet OPO concurrently, and each acquires a random phase. If using a degenerate second-order optical crystal, the random phase acquired will be zero-phase or pi-phase.

Higher-order OPOs may be constructed similarly as described with respect to the Twin OPO and Triplet OPO.

One advantage to using the n-OPO described with respect to RNG 400 is that multiple random-phase signals may be stabilized or decayed within the resonator in a time that exceeds the stabilization or decay time of a single OPO by a short time.

As a comparison, a 2-OPO (Twin OPO) may be significantly faster than the dual OPO of FIG. 2A because of the decreased stabilization and decay times. Additionally, the 2-OPO uses the same cavity and crystal thereby avoiding matching of two separate OPOs as is the case with the dual OPO of FIG. 2A.

OPOs have been described thus far because the OPO provides for amplification of the down-converted signal to a detectable level, thereby reducing the power requirement on the light source and/or reducing the requirements on nonlinear interaction strength. Other implementations not requiring the amplification of an OPO are also within the scope of this disclosure.

Figure 5:
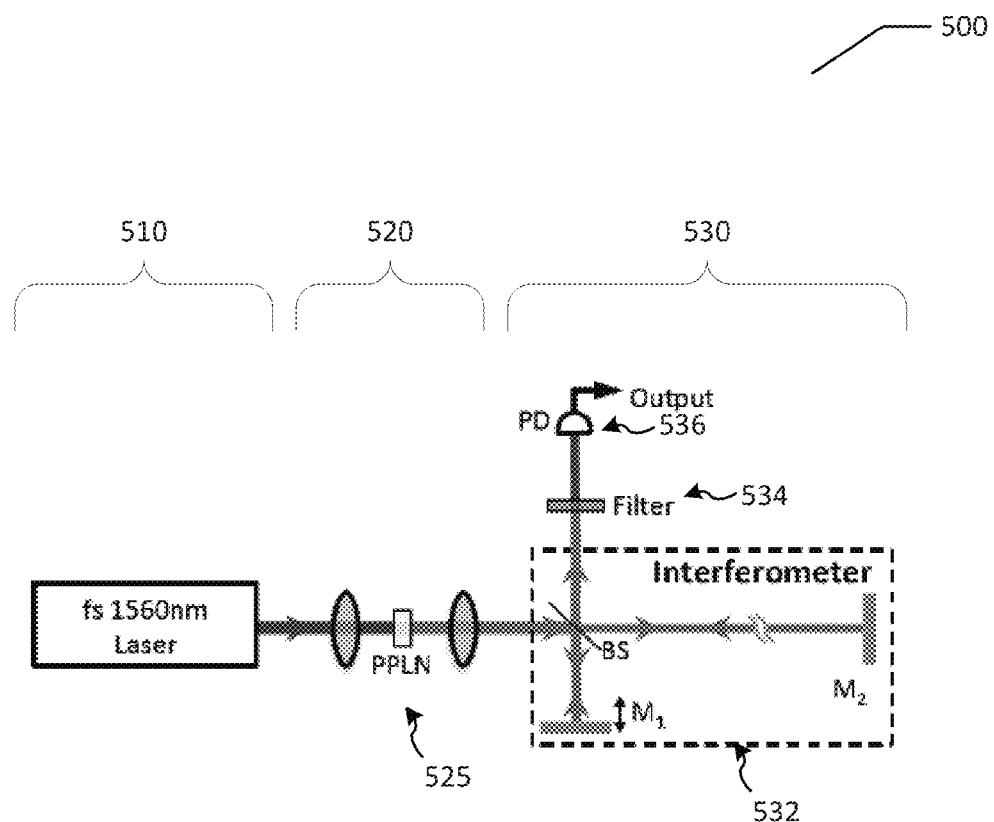
FIG. 5 illustrates an example RNG including an optical parametric generator (OPG).

FIG. 5 illustrates an RNG 500 using an OPG that does not require the use of an OPO. RNG 500 includes a light source 510, an optical unit 520, and a measurement unit 530. Light source 510 is similar to light sources described above, and is not further separately described.

Optical unit 520 is an OPG including a nonlinear optical crystal 525, or alternatively another nonlinear optical component, that converts a pump into multiple outputs at possibly different frequencies. A sequence of starts and stops of crystal 525, such as through pulsing the pump, results in a corresponding sequence of instances for each of the multiple outputs. Each instance has a random phase.

Interferometer 532 includes two unequal-length optical arms, such that the difference between the roundtrip optical path lengths of the two arms is equal to the time between sequential instances of outputs at a selected frequency. With this construction, an instance of an output at the selected frequency is delayed and compared with the next instance of that output, so that the phases of two sequential instances of that output are compared in interferometer 532.

The output of interferometer 532 may be subsequently filtered by filter 534 to pass light at the selected frequency. As previously described, the intensity of the light from interferometer 532 may be measured by photodetector 536, and used to assign a random number.

In an alternative construction of RNG 500, a selected output sequence of crystal 525 is combined with a reference signal and supplied directly to photodetector 536. In another alternative construction, multiple outputs of crystal 525 may be combined together and supplied directly to photodetector 536.

Figure 6:
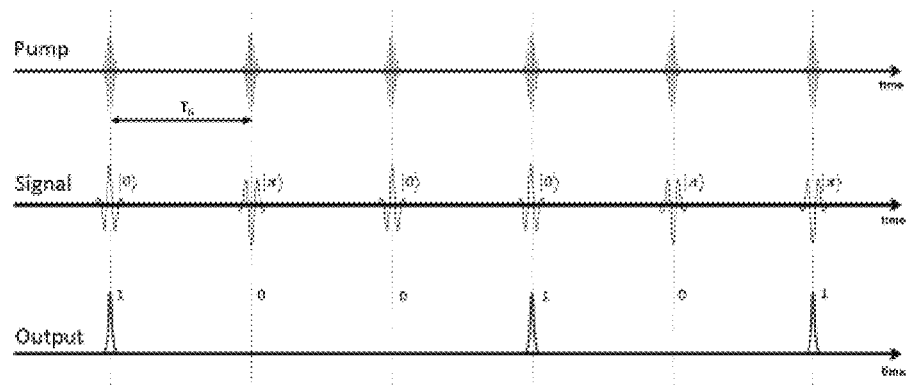
FIG. 6 illustrates an example random number sequence generated by an optical RNG.

FIG. 6 illustrates an example of random number generation for an optical unit 120 in which the output of optical unit 120 is compared to itself after a delay. Each Signal represents a restart of the crystal or OPO in optical unit 120, and is therefore not related to the Signal before or following. The first Output shown is based on the previous Signal not shown, and represents a logic value of '1'. The second Output is based on the sum of the second Signal (phase pi) and the first Signal (phase zero). Since the second and first Signal phases are different, the second Output represents a logic value of '0'. The third Output is based on the sum of the third Signal (phase zero) and the second Signal (phase pi). Since the third and second Signal phases are different, the third Output represents a logic value of '0'. The fourth Output is based on the sum of the fourth Signal (phase zero) and the third Signal (phase zero). Since the fourth and third Signal phases are the same, the fourth Output represents a logic value of '1'. The analysis is the same for the rest of the Outputs.

In some implementations, for example an implementation in which signal phase is one of two known phases, a heterodyne detector or a high-resolution spectrometer may be used instead of one of the measuring units described, to detect slight differences of frequency that occur between different phase states.

Note that, although the descriptions above describe two signals being compared, it is also within the scope of the concept described to compare three or more signals by, for example, adding a parallel OPO, or adding delay arms in the interferometer for sequential Signals.

An RNG has been described that uses the random quantum noise of a nonlinear crystal to generate signals with random phase. An RNG may compare a signal with random phase to one or more other signals with random phase, and the phase information between the random phase signals, which is also random, is used as the basis for assigning a discrete value. Alternatively, an RNG may directly measure phase of a signal to determine phase information.

Therefore, random quantum noise is used to generate a random number.

An OPO used in an RNG may be, but is not necessarily, degenerate. In the case of a non-degenerate (for example, type II) OPO, the resulting random phase is not discrete, but is rather continuous. The pump may be pulsed or continuous wave.

An OPO or OPG implementation may use third-order or higher parametric down-conversion. A degenerate third-order parametric down-conversion process will result in three discrete phase states of zero (0), $2\pi/3$, and $4\pi/3$, which can be used, for example, for ternary random number generation.

An optical unit with a third-order non-linearity may be used for degenerate four-wave mixing, in which the third-order non-linearity is used to generate a signal and an idler, and the sum of the frequencies of the signal and idler is equal to twice the frequency of the pump, such that one of the signal or idler is at a frequency greater than the pump frequency.

The described RNG concept allows random number generation with no need for electronic or computer post processing on a generated bit sequence. The described RNG may be implemented with all-optical operation, it is fast, it is truly random, it is robust, and it has no requirement for photon counting.

Several implementations of the all-optical RNG have been described, including, for example: using either continuous wave or pulsed light sources; either summing two signals or interfering a signal output from the optical unit with the next output; using degenerate or non-degenerate OPOs; using either OPOs or an OPG; implementing two or more OPOs either physically separately or sharing one OPO cavity; and utilizing either discrete or continuous random phases. Other options include alternative kinds of nonlinear processes, resonator selection, and light source selection, among others.

Additionally, other optical components may be used instead of a crystal. For example, an optical fiber may be used. The variety of options available lead to many combinations for implementation of the RNG. Other implementations will be apparent from the discussions above and the claims.

An OPO-based quantum RNG can be implemented using one or more on-chip X-3 OPO, allowing for CMOS compatibility. Additionally, using micro- and nano-resonators, high-speed all-optical quantum RNGs with multi gigabit-per-second (Gbps) rates are possible.

Figure 7A:
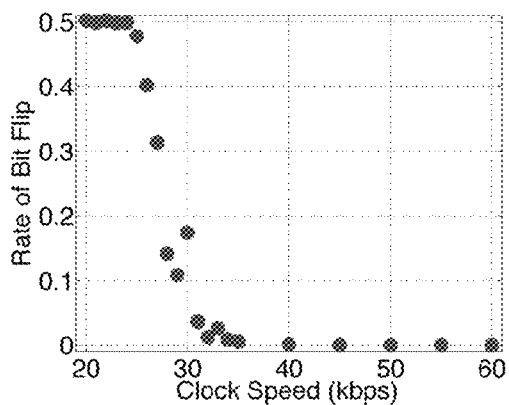
FIG. 7A illustrates a relationship between clock speed and randomness in an OPO.
Figure 7B:
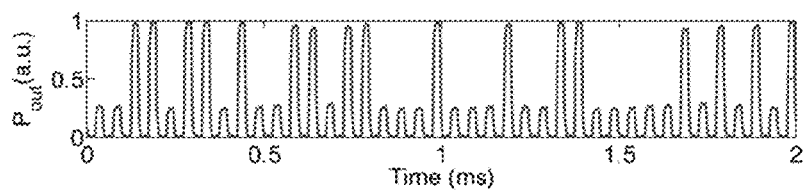
FIG. 7B illustrates randomness in an OPO at one example clock speed.
Figure 7C:
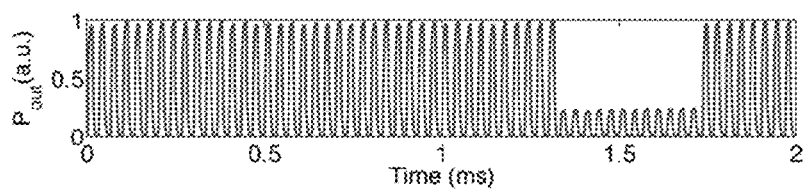
FIG. 7C illustrates randomness in an OPO at another example clock speed.
Figure 7D:
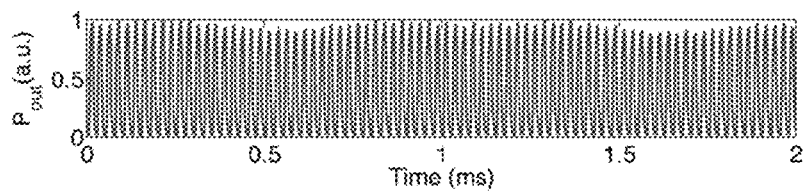
FIG. 7D illustrates randomness in an OPO at another example clock speed.

FIG. 7A illustrates how randomness, measured by the rate of bit flip in a 100-kb long sequence, can break as a function of clock speed. The maximum bit-rate supported by an OPO-based RNG such as described depends on the turn-on and turn-off dynamics of the OPO. At the end of each clock cycle, the intracavity field should decay to the quantum noise level, or the residual field from the previous state will seed oscillation of the next state. FIGS. 7B, 7C, and 7D illustrate output samples for three points on the curve of FIG. 7A, illustrating that when an intracavity reference exists in the form of residual photons from the previous clock cycle, the randomness of the sequence breaks.

Faster bit rates, at least in the Gbps range, are expected to be achievable using pumps with higher repetition rates in combination with shorter OPO cavities.

Further, an OPO may be operated closer to threshold, where the build-up time is longer than the decay time. In this case, oscillation may not reach steady-state, but relative phase may still be measured with a sufficiently sensitive detector to assign a bit value, decoupling maximum RNG speed from cavity decay time. Potentially, the cavity could be eliminated and a single pass parametric down conversion used with a speed as high as the repetition rate but requiring either a sensitive detection system or a relatively high peak power.

An Example and Test Results

In one system used to evaluate the OPO-based RNG concept, a pulse-pumped Twin OPO was used in which two identical OPOs operate in the same ring resonator with the roundtrip optical path length equal to twice the time between pump pulses. The OPO was pumped by a 1560-nm mode-locked Er-fiber laser (Menlo Systems C-fiber, 100 MHz, 70 fs, 300 mW) where the beam was conditioned by a mode-matching telescope for efficient pumping of the OPO. The resonator was a 6-m ring cavity. The pump pulses were converted to two independent signals. These two temporally separated signals had half the repetition rate of the pump, the same polarization and spectral properties, and experienced the same optical paths. An unequal arm interferometer was used to measure the relative phase states of the two signals by interfering them temporally.

The cavity optics included one pair of concave mirrors (M2 and M3) with ROC=50 mm and six flat mirrors, five of which (M4-M8) were gold coated with a material exhibiting approximately 99% reflection. A single dielectric mirror (M1) was used to introduce the pump, which had 90% transmission for the pump and more than 99% reflection in the 2.8-4 mm range. Mirror M1 had a 'chirped' design of dielectric layers to compensate the dispersion of the nonlinear crystal. Broadband gain centered around 3.1 mm was provided by 1-mm long MgO-doped periodically poled lithium niobate (MgO:PPLN) crystal. The poling period is 34.8 mm for broadband type-0 (e=e+e) phase matching at a temperature of 32° C. The crystal was cut such that the mid-IR beam propagated perpendicularly to the poling domains when the beam entered at the Brewster angle. The beam waist for the signal in the crystal was approximately 10 mm.

Mirrors M2 and M3 were set to 5-degree angles of incidence to compensate the astigmatism caused by the Brewster angled crystal and allow stable resonances in the 6-m long cavity.

The output was extracted with a pellicle beam splitter (OC) having approximately 8% reflection over a broad bandwidth. The filters were AR coated Ge substrates to block the pump and allow the mid-IR signal to pass. Oscillation occurred when signal and idler waves were brought into degenerate resonance by fine-tuning the cavity length with the piezo stage of M4. Three resonances occurred separated by approximately 1.5 mm of roundtrip optical path length, corresponding to half of the signal central wavelength. Continuous operation of the OPO was obtained by locking the optical path length to track the center of the strongest resonance using a dither-and-lock scheme.

The Twin OPO started oscillating at a pump average power of about 120 mW, and the maximum mid-IR output power was 4 mW, with signal spectrum centered at 3.1 mm and the pump centered at 1.56 mm. As a test of the randomness of the Twin OPO output, complementary stable fringe patterns at the output of the interferometer were obtained when the beams in the arms were slightly angled vertically, where blocking and unblocking the pump resulted in random toggling between these two patterns. To capture a bit stream, however, the beam angles were well-aligned in the interferometer and a photodetector was used at the output, while an Acousto-Optic Modulator (AOM) caused periodic restarting of the Twin OPO. A binary sequence was extracted from the interferometer output as described above. A sequence of 1 billion bits was taken with this method, and the output proved to be random, with an average of 0.5000.

Figure 8:
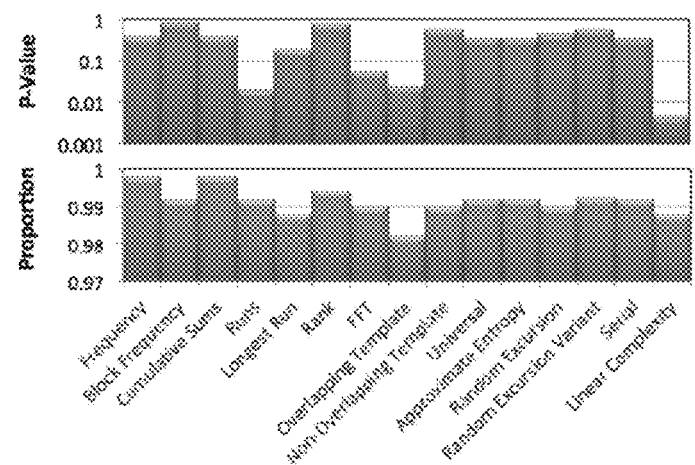
FIG. 8 illustrates test results for one example optical RNG.

To verify statistical randomness, a series of tests developed by the National Institutes of Standards and Technology (NIST) were performed, and the summary of results are presented in FIG. 8. The 1-Gb sequence passed all the NIST statistical tests indicating it is random with 99% confidence.

To maintain randomness for the test system described, the turn off time should be long enough to allow the intracavity power to decay from the steady state level, about 1 W, to the quantum noise level of one photon per mode, which is about 1 mW. Noise level is $P_{noise}=h\nu*\Delta\nu$, where $h\nu$ is the photon energy at the central signal wavelength of 3.1 mm, and $\Delta\nu$ is the OPO bandwidth at 3-dB level, estimated to be approximately 10 THz. The intensity decay time of the OPO can be estimated using:

$$\tau_{off} = \frac{T}{2\delta_E - 2\delta_E \sqrt{\frac{P_{off}}{P_{th}}}}$$

where $\delta$ is the electric-field fractional round-trip loss, $P_{th}$ is the pump power at threshold, $P_{off}$ is the pump power at the "off" state, and T is the cavity roundtrip time. In the presence of the AOM, the OPO threshold measured before M1 is increased to 190 mW because of pulse broadening in the AOM. The pump power at the off state is 168 mW, and intracavity power loss (2 $\delta E$) is estimated to be 0.27 resulting in the 1/e intensity decay time of 1.2 ms. Hence the minimum turn-off time required for decaying from steady state power to quantum noise level is about 17 ms corresponding to a maximum clock speed of approximately 30 kbps.

In the example used in the test, the clock speed was slow enough (and OPO "on"-time long enough) that oscillation built to a steady-state level. The build-up of the tested RNG was much faster than decay due to the low (approximately 23%) modulation depth of the AOM that biases the pump slightly below threshold during the "off" phase of the clock, resulting in a much longer decay time than if the OPO were un-pumped. The clock rate was limited by the time it took for the intensity to decay below noise, which is 10 to 20 times longer than the 1/e cavity decay time when the OPO is pumped well over threshold and allowed to reach steady state.

The invention claimed is:

1. A random number generator, comprising:
   a light source emitting source-emitted light, the source-emitted light having a first frequency value;
   an optical unit including an optical component configured to receive the source-emitted light having the first frequency value and provide component-emitted light having a second frequency value different than the first frequency value; and
   a measurement unit configured to receive the component-emitted light and generate a random output value related to a phase parameter of the component-emitted light, the phase parameter having a random value.

2. The random number generator of claim 1, wherein the phase parameter is a phase of a signal propagating at the second frequency value.

3. The random number generator of claim 1, wherein the phase parameter is a phase difference between two signals, each signal propagating at the second frequency value.

4. The random number generator of claim 1, wherein the optical unit includes an optical parametric generator (OPG).

5. The random number generator of claim 1, wherein the optical unit includes an optical parametric oscillator (OPO).

6. The random number generator of claim 5, wherein the source-emitted light is emitted in pulses, and a roundtrip optical path length of the OPO is substantially equal to twice a time between the pulses such that two signals are generated in the OPO at the second frequency value, and wherein each signal randomly has either a first phase or a second phase separated from the first phase by pi.

7. The random number generator of claim 6, wherein the measurement unit includes an interferometer with two arms of different optical path lengths, and wherein the difference between optical path lengths of the two arms is substantially equal to the time between the pulses, such that an output of the interferometer represents a sum of the two signals generated in the OPO.

8. The random number generator of claim 5, wherein the source-emitted light is emitted in pulses, further comprising a signal generated in the OPO having randomly either a first phase or an opposite second phase.

9. The random number generator of claim 8, wherein the phase parameter is the phase of the signal.

10. The random number generator of claim 5, wherein the OPO is a first OPO, further comprising a second OPO, wherein an output of the second OPO is a signal having the second frequency value and with known phase, wherein the measurement unit is further configured to combine the signal of the first OPO and the signal of the second OPO to generate the random output value.

11. The random number generator of claim 1, wherein the random number generator is implemented on a single integrated circuit.

12. A random number generator, comprising:
    a light source emitting light having a first frequency value;
    a shutter mechanism configured to selectively allow or exclude transmission of light from the light source;
    an optical unit configured to receive light having the first frequency value and output light having a different, second frequency value; and
    a measurement unit configured to determine phase information of the light output from the optical unit and produce a sequence of random values based at least in part on the phase information.

13. The random number generator of claim 12, wherein the measurement unit is further configured to produce a sequence of discrete numbers corresponding to the sequence of random values.

14. The random number generator of claim 12, wherein the light source is a continuous-wave source.

15. The random number generator of claim 12, wherein the light source is a pulsed source.

16. The random number generator of claim 12, wherein the light source is configured to emit light concentrated in a narrow frequency band.

17. The random number generator of claim 12, wherein the phase information is a phase of a signal having the second frequency value.

18. The random number generator of claim 12, wherein the phase information is a phase difference between two signals having the second frequency value.

19. A random number generator, comprising:
    an optical parametric oscillator (OPO) including a nonlinear optical crystal and an optical resonator, the OPO configured to emit a first signal having an oscillation frequency and a phase;
    an interferometer configured to align the first signal from the OPO with a second signal at the oscillation frequency and output a combined signal at the oscillation frequency; and
    a photodetector configured to determine an intensity of the combined signal based on a phase difference between the first signal and the second signal.

20. The random number generator of claim 19, further comprising an output unit configured to assign one of a group of discrete values to the intensity.

21. The random number generator of claim 20, the output unit further configured to generate a random number corresponding to the assigned discrete value.

* * * * *